US008934465B1

(12) United States Patent
Evans

(10) Patent No.: US 8,934,465 B1
(45) Date of Patent: Jan. 13, 2015

(54) SYSTEM AND METHOD FOR BYPASSING AN ACCESS POINT IN A LOCAL AREA NETWORK FOR P2P DATA TRANSFERS

(75) Inventor: Gregory Morgan Evans, Raleigh, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 548 days.

(21) Appl. No.: 13/284,046

(22) Filed: Oct. 28, 2011

Related U.S. Application Data

(63) Continuation of application No. 12/647,923, filed on Dec. 28, 2009, now Pat. No. 8,054,815, and a continuation of application No. 11/443,761, filed on May 31, 2006, now Pat. No. 7,656,849.

(51) Int. Cl.
*H04W 4/00* (2009.01)
*H04L 12/26* (2006.01)
*H04J 3/16* (2006.01)

(52) U.S. Cl.
USPC ............ 370/338; 370/401; 370/409; 370/465

(58) Field of Classification Search
USPC .................................. 370/338, 401, 409, 465
See application file for complete search history.

(56) References Cited

U.S. PATENT DOCUMENTS

| 5,278,834 | A | 1/1994 | Mazzola |
| 5,818,838 | A | 10/1998 | Backes et al. |
| 6,370,584 | B1 | 4/2002 | Bestavros et al. |
| 6,411,946 | B1 | 6/2002 | Chaudhuri |
| 6,665,536 | B1 | 12/2003 | Mahany |
| 6,721,282 | B2 | 4/2004 | Motley |
| 6,791,962 | B2 | 9/2004 | Wentink |
| 6,891,766 | B2 * | 5/2005 | Choi et al. ............... 365/201 |
| 6,987,985 | B2 | 1/2006 | Purkayastha et al. |
| 7,016,668 | B2 | 3/2006 | Vaidyanathan et al. |
| 7,382,879 | B1 | 6/2008 | Miller |
| 7,522,571 | B2 | 4/2009 | Ginzburg |

(Continued)

FOREIGN PATENT DOCUMENTS

GB     2306869 A     5/1997

OTHER PUBLICATIONS

IEEE Computer Society, "IEEE: Amendment 8: Medium Access Control (MAC) Quality of Service Enhancements", IEEE Std 802.11e, Nov. 11, 2005, 221 pages, Institute of Electrical and Electronics Engineers, Inc., New York, NY.

(Continued)

*Primary Examiner* — Dang Ton
*Assistant Examiner* — Robert M Morlan
(74) *Attorney, Agent, or Firm* — Withrow & Terranova, PLLC

(57) ABSTRACT

A system and method for bypassing an access point in a wireless Local Area Network (LAN) for direct point-to-point data transfers are provided. A user device in the wireless LAN is equipped with a primary local wireless interface establishing a wireless communication link with an access point of the wireless LAN, a secondary local wireless interface used for direct point-to-point (P2P) file transfers, and a P2P file transfer application. When the P2P application desires to transfer a data file to another user device within the wireless LAN, the user device determines whether the other user device is within a coverage area of the secondary local wireless interface and whether the file transfer meets one or more alternate transfer criterion. If so, the data file is transferred to the other user device via a direct P2P wireless communication link, thereby bypassing the access point of the wireless LAN.

20 Claims, 4 Drawing Sheets

(56) References Cited

U.S. PATENT DOCUMENTS

| | | |
|---|---|---|
| 7,656,849 B1 | 2/2010 | Evans |
| 7,733,772 B2 | 6/2010 | Hazra et al. |
| 7,733,908 B1 | 6/2010 | Evans |
| 7,895,442 B1 | 2/2011 | Adams et al. |
| 7,987,490 B2 | 7/2011 | Ansari et al. |
| 2002/0010759 A1 | 1/2002 | Hitson et al. |
| 2002/0013812 A1 | 1/2002 | Krueger et al. |
| 2002/0054578 A1 | 5/2002 | Zhang et al. |
| 2002/0061029 A1 | 5/2002 | Dillon |
| 2002/0104099 A1 | 8/2002 | Novak |
| 2002/0110123 A1 | 8/2002 | Shitama |
| 2002/0114336 A1 | 8/2002 | Chow |
| 2002/0129367 A1 | 9/2002 | Devara |
| 2002/0144267 A1 | 10/2002 | Gutta et al. |
| 2002/0156842 A1 | 10/2002 | Signes et al. |
| 2002/0199203 A1 | 12/2002 | Duffy et al. |
| 2003/0050055 A1 | 3/2003 | Ting et al. |
| 2003/0058836 A1 | 3/2003 | Even |
| 2003/0081580 A1 | 5/2003 | Vaidyanathan et al. |
| 2003/0152096 A1 | 8/2003 | Chapman |
| 2003/0161268 A1 | 8/2003 | Larsson et al. |
| 2004/0030798 A1 | 2/2004 | Andersson et al. |
| 2004/0042421 A1 | 3/2004 | Mahany |
| 2004/0117824 A1 | 6/2004 | Karaoguz et al. |
| 2004/0240405 A1 | 12/2004 | Okazaki |
| 2004/0248615 A1 | 12/2004 | Purkayastha et al. |
| 2004/0252651 A1 | 12/2004 | Karlsen et al. |
| 2004/0264372 A1 | 12/2004 | Huang |
| 2005/0008017 A1 | 1/2005 | Datta et al. |
| 2005/0030976 A1* | 2/2005 | Wentink ............ 370/473 |
| 2005/0034001 A1 | 2/2005 | Pontarelli |
| 2005/0036469 A1 | 2/2005 | Wentink |
| 2005/0108769 A1 | 5/2005 | Arnold et al. |
| 2005/0120127 A1 | 6/2005 | Bradley et al. |
| 2005/0135305 A1 | 6/2005 | Wentink |
| 2005/0143123 A1 | 6/2005 | Black et al. |
| 2005/0169632 A1 | 8/2005 | Song et al. |
| 2005/0183120 A1 | 8/2005 | Jain et al. |
| 2005/0192987 A1 | 9/2005 | Marsh |
| 2005/0201340 A1 | 9/2005 | Wang et al. |
| 2005/0216942 A1 | 9/2005 | Barton |
| 2005/0239497 A1 | 10/2005 | Bahl et al. |
| 2005/0286438 A1 | 12/2005 | Rajkotia |
| 2006/0002377 A1* | 1/2006 | Skog et al. ............ 370/352 |
| 2006/0048185 A1 | 3/2006 | Alterman |
| 2006/0048186 A1 | 3/2006 | Alterman |
| 2006/0053452 A1 | 3/2006 | Lee et al. |
| 2006/0056349 A1 | 3/2006 | Nakatugawa et al. |
| 2006/0085830 A1 | 4/2006 | Bruck et al. |
| 2006/0129672 A1 | 6/2006 | Mayer |
| 2006/0206933 A1 | 9/2006 | Molen et al. |
| 2006/0215596 A1 | 9/2006 | Krishnaswamy et al. |
| 2006/0270415 A1 | 11/2006 | Waxman |
| 2007/0002742 A1 | 1/2007 | Krishnaswamy et al. |
| 2007/0061488 A1 | 3/2007 | Alagappan et al. |
| 2007/0061580 A1 | 3/2007 | Venkatesan et al. |
| 2007/0064643 A1* | 3/2007 | Tavares ............ 370/328 |
| 2007/0110080 A1* | 5/2007 | Bennett ............ 370/400 |
| 2007/0160017 A1 | 7/2007 | Meier et al. |
| 2009/0067328 A1 | 3/2009 | Morris et al. |

OTHER PUBLICATIONS

No Author, "Double 108Mbps Wireless PC Card (WG511U), Netgear, Inc.," PC Connection, 2006, http://http://www.pcconnection.com/ProductDetail?sku=5373172&SourceID=k40132, accessed on Apr. 5, 2006, 2 pages.

No Author, "Series 2 TiVo Home Media Features Guide," TiVo Inc., 2005, 47 pages.

Raisinghani, V., "ECLAIR: An Efficient Cross Layer Architecture for Wireless Protocol Stacks," 5th World Wireless Congress, San Francisco, CA, May 25-28, 2004, 6 pages.

Setton, E. et al., "Cross-Layer Design of Ad Hoc Networks for Real-Time Video Streaming," IEEE Wireless Communications, Aug. 2005, vol. 12, Issue 4, pp. 59-65.

Srivastava, V. et al., "Cross-Layer Design: A Survey and the Road Ahead," IEEE Communications Magazine, Dec. 2005, vol. 43, Issue 12, pp. 112-119.

Non-final Office Action for U.S. Appl. No. 11/443,761 mailed Dec. 10, 2008, 18 pages.

Non-final Office Action for U.S. Appl. No. 11/443,761 mailed May 11, 2009, 14 pages.

Notice of Allowance for U.S. Appl. No. 11/443,761 mailed Nov. 16, 2009, 6 pages.

Non-final Office Action for U.S. Appl. No. 12/647,923 mailed Oct. 1, 2010, 5 pages.

Non-final Office Action for U.S. Appl. No. 12/647,923 mailed Feb. 18, 2011, 7 pages.

Notice of Allowance for U.S. Appl. No. 12/647,923 mailed Jul. 7, 2011, 7 pages.

* cited by examiner

SYSTEM AND METHOD FOR BYPASSING AN ACCESS POINT IN A LOCAL AREA NETWORK FOR P2P DATA TRANSFERS

CROSS-REFERENCE TO RELATED APPLICATION

The present application is a continuation of U.S. patent application Ser. No. 12/647,923, filed on Dec. 28, 2009, which was a continuation of U.S. Pat. No. 7,656,849, issued on Feb. 2, 2010, the disclosures of both applications are hereby incorporated by reference in its entirety; therefore, the present application claims priority to both the application and patent.

FIELD OF THE INVENTION

The present invention relates to a system for bypassing an access point in a local wireless network for direct point-to-point (P2P) data transfers.

BACKGROUND OF THE INVENTION

The in-home Local Area Network (LAN) traffic model is beginning to change due to Digital Rights Management (DRM) and the storage of large multimedia collections on various devices coupled to the in-home LAN. For example, a consumer may have multiple Personal Video Recorders (PVRs), such as the TiVo Series 2 PVR, connected to the consumer's in-home LAN, wherein multimedia content may be transferred from one PVR to another via the in-home LAN. The most common in-home LANs are wireless LANs formed using local wireless access points, such as IEEE 802.11 access points. The resulting problem is that transferring multimedia files between devices, such as PVRs, using a traditional wireless LAN results in very inefficient use of the limited unlicensed radio frequency (RF) spectrum. More specifically, if, for example, the IEEE 802.11g communication standard is used, each transfer of a multimedia file uses a first portion of the IEEE 802.11g RF spectrum for a first wireless communication link between a source device and the access point and a second portion of the IEEE 802.11g RF spectrum for a second wireless communication link between the access point and a destination device. Further, contention for bandwidth at the access point as packets are switched from receive to transmit adds additional delay, thereby further wasting the RF spectrum and compute cycles on the PVRs and access point. Overall, this transfer process can be slow and burdensome to the application performing the file transfer. In addition, the Quality-of-Service (QOS) for other wireless connections and applications currently using the access point is also impaired.

Thus, there is a need for a system and method for efficiently transferring data files between devices in a wireless LAN.

SUMMARY OF THE INVENTION

The present invention provides a system and method for bypassing an access point in a wireless Local Area Network (LAN) for direct point-to-point data transfers. In one embodiment, a user device in the wireless LAN is equipped with a primary local wireless interface establishing a wireless communication link with an access point of the wireless LAN, a secondary local wireless interface for establishing secondary wireless communication links with other user devices for direct point-to-point (P2P) file transfers, and a P2P file transfer application. When the P2P application desires to transfer a data file, such as a media file, from the user device to another user device within the wireless LAN, the user device determines whether the other user device is within a coverage area of the secondary local wireless interface and whether the file transfer meets one or more alternate transfer criteria. If so, a direct P2P wireless communication link is established with the other user device using the secondary local wireless interface, and the data file is transferred to the other user device via the direct P2P wireless communication link. As a result, the access point for the wireless LAN is bypassed, and as such, the use of radio frequency spectrum is minimized. If the other user device is not within the local wireless coverage area of the secondary local wireless interface or if the file transfer does not meet the alternate transfer criteria, then the data file is transferred to the other user device via the access point.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
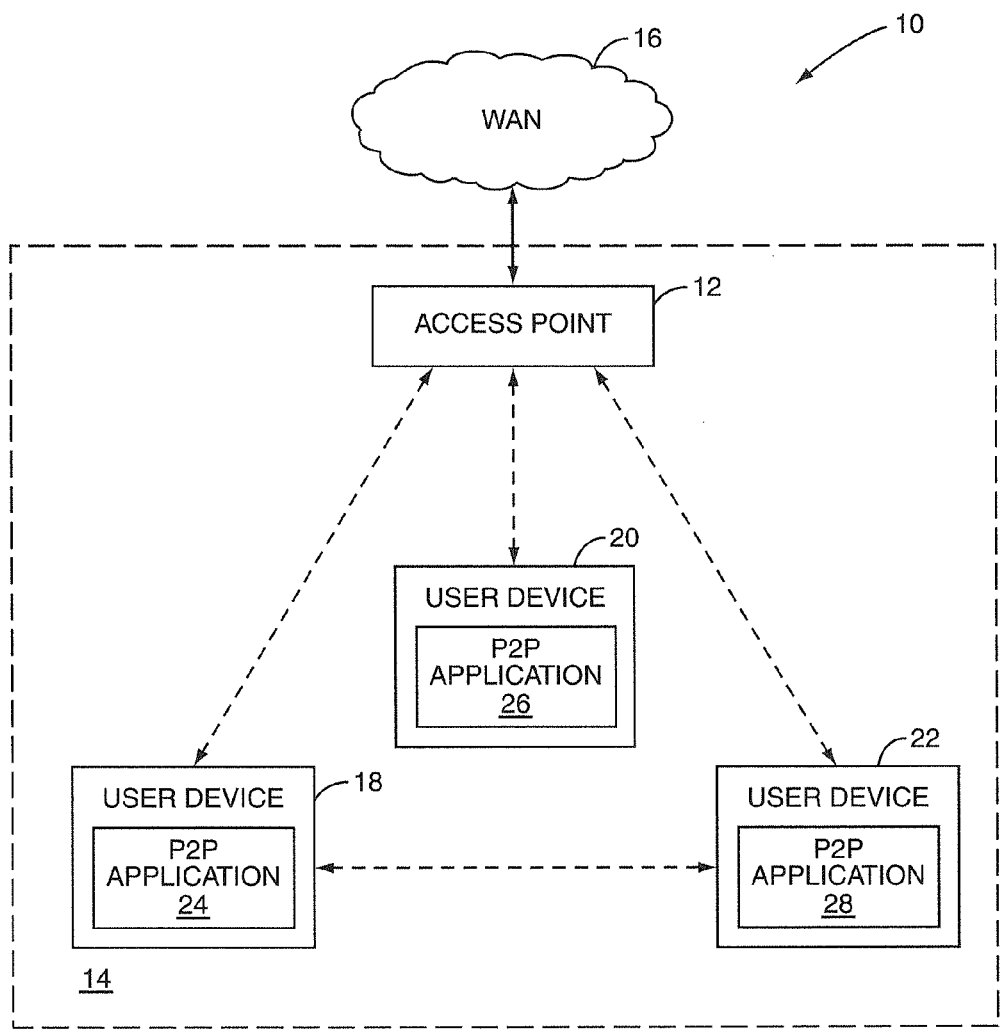
FIG. 1 illustrates a system 10 for bypassing an access point of a wireless Local Area Network (LAN) for direct point-to-point (P2P) data transfers according to one embodiment of the present invention.

FIG. 1 illustrates a system 10 for bypassing an access point 12 of a wireless Local Area Network (LAN) 14 for direct point-to-point (P2P) data transfers according to one embodiment of the present invention. In general, the system 10 includes the access point 12 coupling the wireless LAN 14 to a Wide Area Network (WAN) 16, which is preferably a distributed public access network, such as the Internet. Note that the access point 12 may be communicatively coupled to the WAN 16 by a modem (not shown) or the like. The wireless LAN 14 includes the access point 12 and user devices 18-22.

The user devices 18-22 may be, for example, Personal Video Recorders (PVRs), media servers, media players for playing media content provided by a media server, desktop computers, notebook computers, Personal Digital Assistants (PDAs), mobile telephones, or the like, or any combination thereof. Further, as discussed below with respect to FIGS. 3 and 4, each of the user devices 18-22 includes a primary local wireless interface establishing a primary wireless communication link with the access point 12 and a secondary local wireless interface for establishing a direct P2P communication link with another user device for direct file transfers according to the present invention.

The primary and secondary local wireless interfaces may be implemented using separate wireless network interface cards, such as, but not limited to, two IEEE 802.11 network interface cards or a single network interface card having multiple radios such as, for example, Netgear's Double 108 Mbps Wireless PC Card. The primary local wireless interface may be a network interface card operating according to the 802.11g standard, and the secondary local wireless interface may be a network interface card operating according to the 802.11a standard. Since the 802.11g standard uses the 2.4 GHz frequency band and the 802.11a standard uses the 5 GHz frequency band, direct P2P file transfers via the secondary local wireless interface do not affect the availability of the primary network associated with the primary local wireless interface card. Alternatively, the primary and secondary interfaces may operate in non-overlapping channels of the same frequency band. It should be noted that the present invention is not limited to the IEEE 802.11 suite of standards. The primary and secondary local wireless interfaces may operate according to one of the suite of IEEE 802.11 standards, the Bluetooth standard, or the like, or any combination thereof.

The user device 18 includes a P2P application 24, which may be implemented in software. The P2P application 24 operates to transfer data files from the user device 18 to another user device 20, 22 within the wireless LAN 14. According to the present invention, the file transfer may be performed via the access point 12 or a direct P2P wireless communication link, as described below in detail. In one embodiment, the data files transferred are multimedia files such as, but not limited to, movies and television programs. However, the data files may alternatively or additionally be any type of data file such as images, documents, presentations, spreadsheets, and the like. Likewise, the user devices 20 and 22 include P2P applications 26 and 28, respectively.

In one embodiment, the user devices 18-22 are PVRs, such as TiVo PVRs, and the P2P applications 24-28 operate to transfer recorded multimedia content among the PVRs within the wireless LAN 14. In another embodiment, the user devices 18-22 may be a combination of PVRs and, for example, personal computers, wherein multimedia content such as, but not limited to, videos, images, and the like is exchanged between the PVRs and personal computers. For example, the user devices 18 and 20 may be PVRs and the user device 22 may be a personal computer. In another exemplary embodiment, the user device 18 may be a multimedia server and the user devices 20 and 22 may be any type of device enabled to play multimedia provided by the multimedia server such as those manufactured and sold by Buffalo Technologies (http://buffalotech.com).

Figure 2:
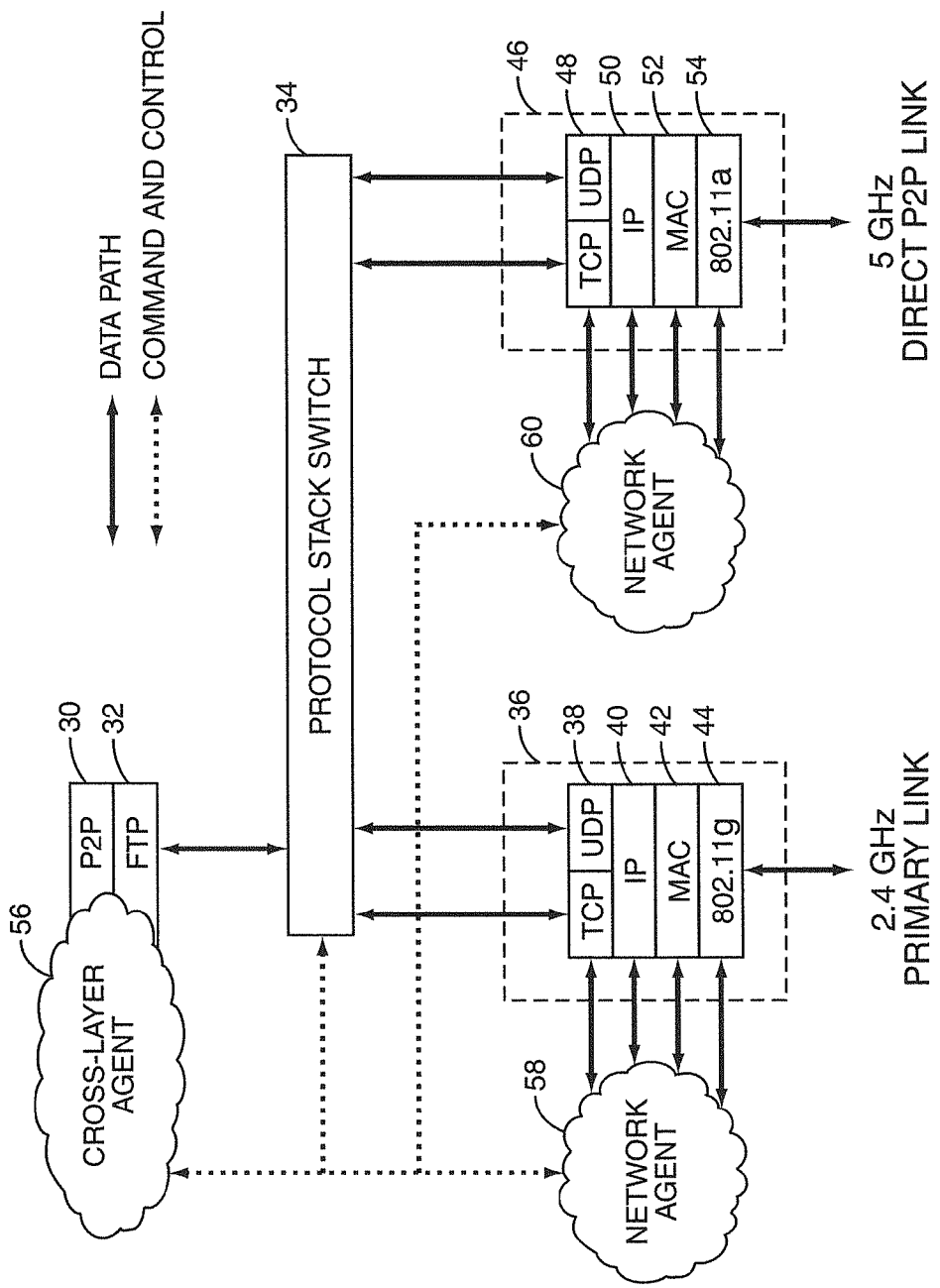
FIG. 2 illustrates an exemplary cross-layer implementation of a protocol stack of a user device enabling bypassing of the access point for direct P2P data transfers according to one embodiment of the present invention.

FIG. 2 illustrates an exemplary cross-layer implementation of a protocol stack of the user device 18 enabling the transfer of data files from the user device 18 to another user device 20, 22 by either the access point 12 or a direct P2P communication link according to one embodiment of the present invention. Note that this discussion is equally applicable to the user devices 20 and 22. As illustrated, the protocol stack includes a P2P application layer 30, which corresponds to the P2P application 24; a file transfer application layer 32, which in this example is a File Transfer Protocol (FTP) application; and a protocol stack switch 34, which may be implemented in software, hardware, or a combination of software and hardware. For a primary local wireless interface 36, the protocol stack further includes a transport layer 38, which in this example includes a Transfer Control Protocol (TCP) service and a User Datagram Protocol (UDP) service; a network layer 40, which in this example provides an Internet Protocol (IP) service; a data link layer 42, which in this example provides a Media Access Control (MAC) service; and a physical layer 44, which in this example includes an 802.11g (2.4 GHz) physical wireless interface. Likewise, for a secondary local wireless interface 46, the protocol stack further includes a transport layer 48, a network layer 50, a data link layer 52, and a physical layer 54, which in this example includes an 802.11a (5 GHz) physical interface. Note that the primary and secondary local wireless interfaces 36 and 46 may be implemented as separate interfaces, such as separate network interface cards (NICs); or as a single system, such as a single NIC, wherein the primary and secondary local wireless interfaces 36 and 46 share common hardware and software functionality.

It should be noted that while only one secondary local wireless interface 46 is illustrated, the present invention is not limited thereto. The user devices 18-22 may include multiple secondary local wireless interfaces. For example, the user devices 18-22 may include three secondary local wireless interfaces. The secondary local wireless interfaces may be used in combination to provide a high bandwidth direct P2P communication channel with another user device or used separately to provide separate direct P2P communication links with multiple user devices. Multiple secondary wireless interfaces may also be used to provide a Multiple Input Multiple Output (MIMO) system such as that in the proposed IEEE 802.11n standard.

A cross-layer agent 56 and network agents 58 and 60 effectively create an interface between the P2P application layer 30, the file transfer application layer 32, or both the P2P application layer 30 and the file transfer application layer 32 and the lower protocol layers 38-44 and 48-54. In addition, the cross-layer agent 56 controls the protocol stack switch 34 to effect file transfers via either the primary local wireless interface 36 or the secondary local wireless interface 46, as described below. It should be noted that traditionally each of the layers of the protocol stack had interfaces to only adjacent layers in the protocol stack. For example, the data link layer 42 would only have interfaces to the network layer 40 and the physical layer 44. However, according to the present invention, the cross-layer agent 56 and the network agents 58 and 60 establish interfaces enabling interaction between non-adjacent layers in the protocol stack. Thus, for example, in a point-to-point transfer the network layer 40 and the link layer 42 may not be needed and may therefore be by-passed to provide a more efficient transfer.

The network agents 58 and 60 may be implemented in hardware, software, or a combination of hardware and software and operate to monitor the primary and secondary local wireless interfaces 36 and 46 and report the performance of the local wireless interfaces 36 and 46 to the cross-layer agent 56. For example, the network agents 58 and 60 may monitor and report information such as, but not limited to, LAN IP addresses of other user devices having secondary local wireless interfaces for direct P2P communication with RF frequencies available, the current usage of these secondary local wireless interfaces, available bandwidth of each of these secondary local wireless interfaces, and Quality of Service (QoS) for each of these secondary local wireless interfaces and RF frequencies, and the like. The QoS may be determined based on Forward Error Correction (FEC), acknowledged versus non-acknowledged packets, RF power margins, and the like.

The cross-layer agent 56 may be implemented in software, hardware, or a combination of hardware and software. The cross-layer agent 56 may optionally be implemented as part of either the P2P application 28 or the file transfer application of the P2P application layer 30 or the file transfer application layer 32, respectively. The cross-layer agent 56 may receive information from the network agents 58 and 60 and may be invoked by either the P2P application layer 30 or the file transfer application layer 32 to control the protocol stack switch 34 such that a file transfer is effected through either the primary or secondary local wireless interface 36, 46, as described below.

Figure 3:
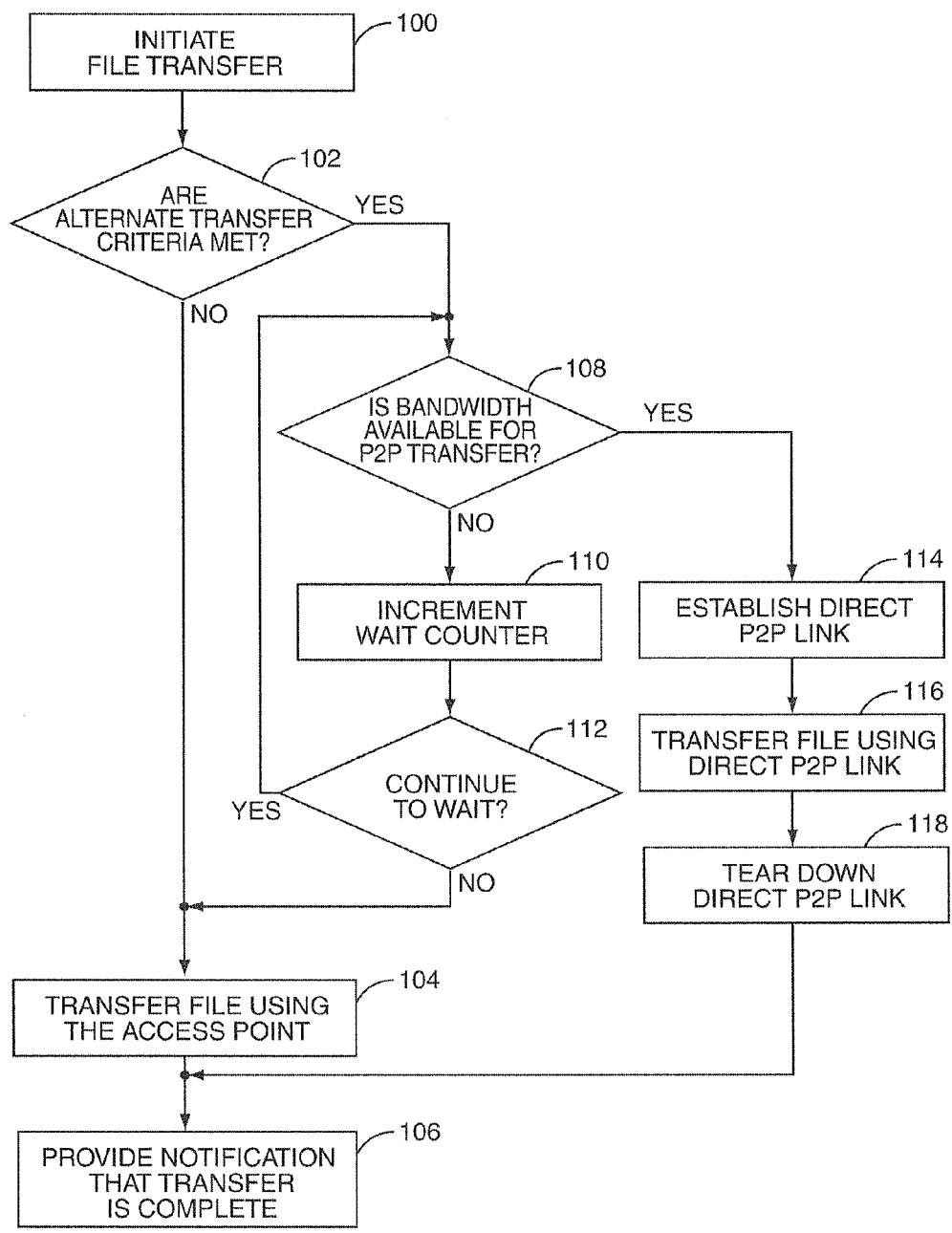
FIG. 3 is a flow chart illustrating an exemplary process for determining whether to transfer a data file via the access point or a direct P2P communication link according to one embodiment of the present invention.

FIG. 3 is a flow chart illustrating the operation of the cross-layer agent 56 according to an exemplary embodiment of the present invention. Note that this discussion is equally applicable to cross-layer agents on the user devices 20 and 22. First, a file transfer is initiated by either the P2P application layer 30 or the file transfer application layer 32 (step 100). The desired recipient of the file transfer is the user device 22. The cross-layer agent 56 then determines whether one or more alternate transfer criteria are met (step 102). More specifically, the cross-layer agent 56 may determine whether the user device 22 is equipped with a secondary local wireless interface and is within a local wireless coverage area of a secondary local wireless interface of the user device 18. The alternate transfer criteria may include a file size of the file to be transferred, a history of the primary and secondary network availability, a priority level of the transfer, a file type of the file to be transferred, and the like. This would include determining if the additional time and overhead associated with configuring the secondary transfer out-weighs the benefits of by-passing the access point 12. The cross-layer agent 56 may determine whether the alternate transfer criteria are satisfied based on, at least in part, information regarding the primary and secondary local wireless interfaces 36 and 46 provided to the cross-layer agent 56 from the network agents 58 and 60.

For the file size, the cross-layer agent 56 may determine whether the file size of the file to be transferred is greater than a threshold file size. If so, the file may be preferably transferred by a direct P2P communication link. Regarding network availability, the cross-layer agent 56 may determine whether the primary or secondary network has been frequently unavailable or available in the past and determine whether to transfer the file by a direct P2P communication link based on, at least in part, the history of network availability. As for priority, files having a high priority may preferably be transferred via, for example, a direct P2P communication link. Regarding file types, files of predetermined file types, such as multimedia file types, may preferably be transferred via direct P2P communication.

If the alternate transfer criteria are not met, the cross-layer agent 56 controls the protocol stack switch 34 to couple the file transfer application layer 32 to the transport layer 38 of the primary local wireless interface 36, thereby effecting transfer of the file to the user device via the access point 12 (step 104). When transferring the file via the access point 12, packets corresponding to the file are transferred to the access point 12 via the primary wireless communication link between the user device 18 and the access point 12, and the access point 12 then routes the packets to the user device 22 via the primary wireless communication link between the access point 12 and the user device 22. Once the transfer is complete, the cross-layer agent 56 notifies the initiating application, which is either the P2P application 28 of the P2P application layer 30 or the file transfer application of the file transfer application layer 32 (step 106).

Returning to step 102, if the alternate transfer criteria are satisfied, the cross-layer agent 56 then determines whether bandwidth is available for a direct P2P transfer based on the information from the network agent 60 associated with the secondary local wireless interface 46 (step 108). If bandwidth is not available, a wait counter is incremented (step 110), and the cross-layer agent 56 determines whether it should continue to wait for available bandwidth (step 112). The cross-layer agent 56 may determine whether to wait based on the wait counter. For example, the cross-layer agent 56 may continue to wait until the wait counter reaches a predetermined threshold. The predetermined threshold may be fixed for all transfers or may be a function of factors such as a priority of the file transfer, network conditions, or the like. If the bandwidth does not become available during the permitted wait period, the cross-layer agent 56 controls the protocol stack switch 34 to couple the file transfer application layer 32 to the transport layer 38 of the primary local wireless interface 36 to effect transfer of the file via the access point 12 (step 104).

Returning to step 108, if bandwidth is available, the cross-layer agent 56 controls the protocol stack switch 34 to couple the file transfer application layer 32 to the transport layer 48 of the secondary local wireless interface 46, and a direct P2P wireless communication link between the user devices 18 and 22 is established (step 114). The file is then transferred to the user device 22 via the direct P2P wireless communication link, thereby bypassing the access point 12 and minimizing the use of RF spectrum (step 116). Once the file has been transferred, the direct P2P wireless communication link between the user devices 18 and 22 is torn down, or terminated (step 118), and the initiating application is notified that transfer is complete (step 106).

Figure 4:
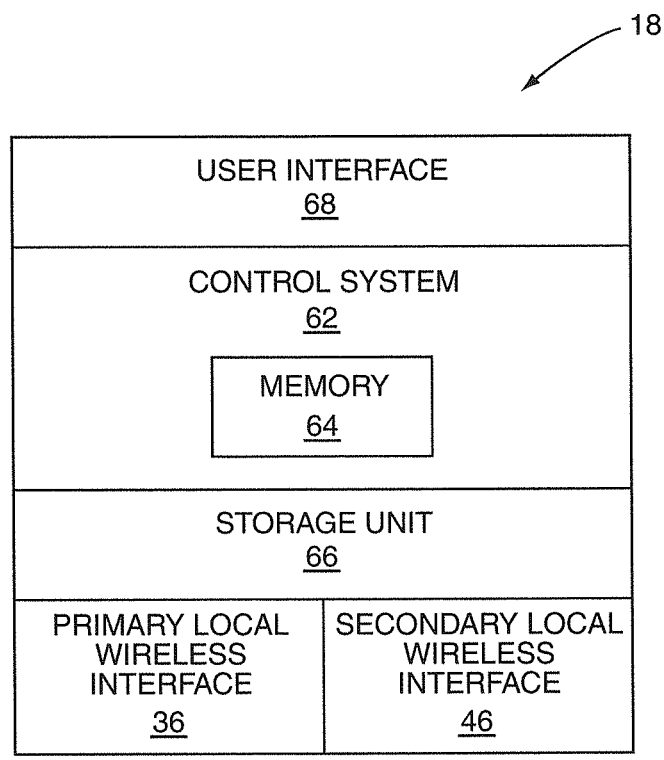
FIG. 4 is a block diagram of a user device operating according to one embodiment of the present invention.

FIG. 4 is a block diagram of an exemplary embodiment of the user device 18 of FIG. 1. Note that this discussion is equally applicable to the user devices 20 and 22. In general, the user device 18 includes a control system 62 having associated memory 64. The memory 64 stores software instructing the user device 18 to operate according to the present invention. More specifically, in one embodiment, the P2P application 24, the file transfer application of the file transfer application layer 32, the protocol stack switch 34, the cross-layer agent 56, and the network agents 58 and 60 may be implemented, at least in part, in software and stored in memory 64. The user device 18 may also include a storage unit 66 for storing files, such as, but not limited to, multimedia files that may be transferred to the user devices 20, 22 according to the present invention. The storage unit 66 may be any digital storage unit. As an example, the storage unit 66 may be one or more hard disc drives or the like. Alternatively, files may be stored in memory 64. The user device 18 also includes the primary and secondary local wireless interfaces 36 and 46. In addition, the user device 18 includes a user interface 68, which may include components such as, but not limited to, a display, an input device, speakers, and the like.

Those skilled in the art will recognize improvements and modifications to the preferred embodiments of the present invention. All such improvements and modifications are considered within the scope of the concepts disclosed herein and the claims that follow.

What is claimed is:

1. A computer program product for transferring data from a first user device within a wireless local area network to a second user device within the wireless local area network, the computer program product stored on a non-transitory computer-readable storage medium and including instructions configured to cause the first user device to:
monitor at least one of a physical layer, a data link layer, a network layer, and a transport layer of a primary local wireless interface, wherein each of the layers are configured to interact with non-adjacent layers;
monitor at least one of a physical layer, a data link layer, a network layer, and a transport layer of a secondary local wireless interface, wherein each of the layers are configured to interact with non-adjacent layers;
obtain information regarding the secondary local wireless interface;
determine to transfer the data to the second user device via a direct point-to-point wireless communication link based on at least a portion of the information regarding the secondary local wireless interface, where the secondary local wireless interface communicates with the second user device using the direct point-to-point wireless communication link;
initiate a data transfer from the first user device to the second user device;
if the data is to be transferred via the direct point-to-point wireless communication link:
transfer the data to the second user device via the direct point-to-point wireless communication link, thereby bypassing an access point, wherein the first user device is a computing device.

2. The computer program product of claim 1, wherein the direct point-to-point wireless communication link uses the secondary local wireless interface.

3. The computer program product of claim 2, wherein the instructions are further configured to cause the first user device to:
determine whether to transfer the data via the direct point-to-point wireless communication link or via the access point, wherein the primary local wireless interface communicates with the access point; and
transfer the data to the access point via a first local wireless communication link between the first user device and the access point if the data is to be transferred to the second user device via the access point, wherein the access point routes the data to the second user device via a second local wireless communication link between the access point and the second user device.

4. The computer program product of claim 3, wherein the instructions are further configured to cause the first user device to establish the first local wireless communication link between the first user device and the access point using the primary local wireless interface.

5. The computer program product of claim 3 wherein determining whether to transfer the data to the second user device via the direct point-to-point wireless communication link or via the access point further comprises determining whether bandwidth is available for the direct point-to-point wireless communication link.

6. The computer program product of claim 3 wherein determining whether to transfer the data to the second user device via the direct point-to-point wireless communication link or via the access point comprises determining whether the second user device is within a local wireless coverage area of the secondary local wireless interface.

7. The computer program product of claim 6 wherein determining whether to transfer the data to the second user device via the direct point-to-point wireless communication link or via the access point further comprises determining whether a file size of the data is greater than a predetermined threshold.

8. The computer program product of claim 6 wherein determining whether to transfer the data to the second user device via the direct point-to-point wireless communication link or via the access point further comprises determining whether a file type of the data is one of a predetermined list of data types.

9. The computer program product of claim 6 wherein determining whether to transfer the data to the second user device via the direct point-to-point wireless communication link or via the access point further comprises determining whether to transfer the data to the second user device via the direct point-to-point wireless communication link based on a priority of the data.

10. The computer program product of claim 6 wherein determining whether to transfer the data to the second user device via the direct point-to-point wireless communication link or via the access point further comprises determining whether to transfer the data to the second user device via the direct point-to-point wireless communication link based on a history of performance for the primary and secondary local wireless interfaces.

11. A method for transferring data from a first user device within a wireless local area network to a second user device within the wireless local area network:
monitoring at least one of a physical layer, a data link layer, a network layer, and a transport layer of a primary local wireless interface, wherein each of the layers are configured to interact with non-adjacent layers;
monitoring at least one of a physical layer, a data link layer, a network layer, and a transport layer of a secondary local wireless interface, wherein each of the layers are configured to interact with non-adjacent layers;
obtaining information regarding the secondary local wireless interface;
determining to transfer the data to the second user device via a direct point-to-point wireless communication link based on at least a portion of the information regarding the secondary local wireless interface, where the secondary local wireless interface communicates with the second user device using the direct point-to-point wireless communication link;
initiating a data transfer from the first user device to the second user device;
if the data is to be transferred via the direct point-to-point wireless communication link:
transferring the data to the second user device via the direct point-to-point wireless communication link, thereby bypassing an access point, wherein the first user device is a computing device.

12. The method of claim 11, wherein the direct point-to-point wireless communication link uses the secondary local wireless interface.

13. The method of claim 12, wherein the method further comprises:
determining whether to transfer the data via the direct point-to-point wireless communication link or via the access point, wherein the primary local wireless interface communicates with the access point; and
transferring the data to the access point via a first local wireless communication link between the first user device and the access point if the data is to be transferred to the second user device via the access point, wherein the access point routes the data to the second user device via a second local wireless communication link between the access point and the second user device.

14. The method of claim 13, wherein the method further comprises establishing the first local wireless communication link between the first user device and the access point using the primary local wireless interface.

15. The method of claim 13 wherein determining whether to transfer the data to the second user device via the direct point-to-point wireless communication link or via the access point further comprises determining whether bandwidth is available for the direct point-to-point wireless communication link.

16. The method of claim 13 wherein determining whether to transfer the data to the second user device via the direct point-to-point wireless communication link or via the access point comprises determining whether the second user device is within a local wireless coverage area of the secondary local wireless interface.

17. The method of claim 16 wherein determining whether to transfer the data to the second user device via the direct point-to-point wireless communication link or via the access point further comprises determining whether a file size of the data is greater than a predetermined threshold.

18. The method of claim 16 wherein determining whether to transfer the data to the second user device via the direct point-to-point wireless communication link or via the access point further comprises determining whether a file type of the data is one of a predetermined list of data types.

19. The method of claim 16 wherein determining whether to transfer the data to the second user device via the direct point-to-point wireless communication link or via the access point further comprises determining whether to transfer the data to the second user device via the direct point-to-point wireless communication link based on a priority of the data.

20. The method of claim 16 wherein determining whether to transfer the data to the second user device via the direct point-to-point wireless communication link or via the access point further comprises determining whether to transfer the data to the second user device via the direct point-to-point wireless communication link based on a history of performance for the primary and secondary local wireless interfaces.

* * * * *